(12) United States Patent
Chen et al.

(10) Patent No.: US 11,994,248 B2
(45) Date of Patent: May 28, 2024

(54) GAS LINE SEAL CLAMP AND METHOD OF SEALING A GAS LINE

(71) Applicant: JS Products, Inc., Las Vegas, NV (US)

(72) Inventors: Chungeng Chen, Las Vegas, NV (US); Travis Cottle, Glenview, IL (US); Jeff Mainzer, Wheeling, IL (US)

(73) Assignees: JS Products, Inc., Las Vegas, NV (US); GTI Energy, Des Plaines, IL (US)

(*) Notice: Subject to any disclaimer, the term of this patent is extended or adjusted under 35 U.S.C. 154(b) by 193 days.

(21) Appl. No.: 17/487,832

(22) Filed: Sep. 28, 2021

(65) Prior Publication Data

US 2022/0099232 A1 Mar. 31, 2022

Related U.S. Application Data

(60) Provisional application No. 63/198,090, filed on Sep. 28, 2020.

(51) Int. Cl.
 *F16L 55/178* (2006.01)
(52) U.S. Cl.
 CPC .................. *F16L 55/178* (2013.01)
(58) Field of Classification Search
 CPC ......... F16L 55/168; F16L 55/17; F16L 55/18; F16L 55/178
 See application file for complete search history.

(56) References Cited

U.S. PATENT DOCUMENTS

| | | | | |
|---|---|---|---|---|
| 1,618,234 A | * | 2/1927 | Skinner | F16L 55/172 24/284 |
| 1,727,038 A | * | 9/1929 | Rousey | F16L 41/16 24/268 |
| 2,031,499 A | * | 2/1936 | Norton | F16L 55/178 277/623 |
| 2,059,573 A | * | 11/1936 | Gavin | F16L 55/178 285/337 |
| 2,504,881 A | * | 4/1950 | Russell | F16L 55/1715 24/270 |
| 2,821,416 A | * | 1/1958 | Soehnlen | F16L 55/178 285/374 |
| 3,171,419 A | * | 3/1965 | Black | F16L 55/1683 29/402.09 |

(Continued)

FOREIGN PATENT DOCUMENTS

| | | | | |
|---|---|---|---|---|
| DE | 102020124721 A1 | * | 3/2022 | |
| GB | 2505519 A | * | 3/2014 | ......... F16L 55/1683 |
| JP | 2017166565 A | * | 9/2017 | |

*Primary Examiner* — Eugene G Byrd
(74) *Attorney, Agent, or Firm* — Weide & Miller, Ltd.

(57) ABSTRACT

A seal clamp, such as for gas lines, includes a handle assembly having a handle, a transfer or drive assembly cooperable with the handle, and a clamping assembly including first and second claws or clamps and a seal member. The first and second claws or clamps are cooperable with the transfer assembly. The seal member is structured to seal a puncture in a gas line. Responsive to movement of the handle, the first and second claws or clamps move from an OPEN position to a CLOSED position, such as to engage a pipe and create a clamping force which forces the seal member into engagement with the pipe, such as a puncture, to seal the pipe.

18 Claims, 5 Drawing Sheets

(56) References Cited

U.S. PATENT DOCUMENTS

| | | | | |
|---|---|---|---|---|
| 3,502,112 | A * | 3/1970 | Michael | F16L 55/17 |
| | | | | 81/332 |
| 3,910,610 | A * | 10/1975 | Turner | F16L 55/178 |
| | | | | 285/24 |
| 4,057,082 | A * | 11/1977 | King | F16L 55/1705 |
| | | | | 138/99 |
| 4,111,234 | A * | 9/1978 | Wells | F16L 55/172 |
| | | | | 138/167 |
| 4,721,330 | A * | 1/1988 | Woodhouse | F16L 21/04 |
| | | | | 285/337 |
| 5,692,544 | A * | 12/1997 | Friedrich | F16L 55/178 |
| | | | | 285/15 |
| 8,789,852 | B2 * | 7/2014 | Wilkinson | F16L 55/172 |
| | | | | 285/15 |
| 2005/0050702 | A1 * | 3/2005 | Green | B25B 9/00 |
| | | | | 29/263 |
| 2016/0010782 | A1 * | 1/2016 | Skinner | F16L 55/18 |
| | | | | 285/15 |
| 2016/0047509 | A1 * | 2/2016 | Long | F16L 55/18 |
| | | | | 138/99 |
| 2017/0167646 | A1 * | 6/2017 | Chiproot | F16L 21/065 |
| 2020/0011470 | A1 * | 1/2020 | Horikawa | F16L 55/1612 |
| 2022/0154868 | A1 * | 5/2022 | Cottle | F16L 55/07 |

\* cited by examiner

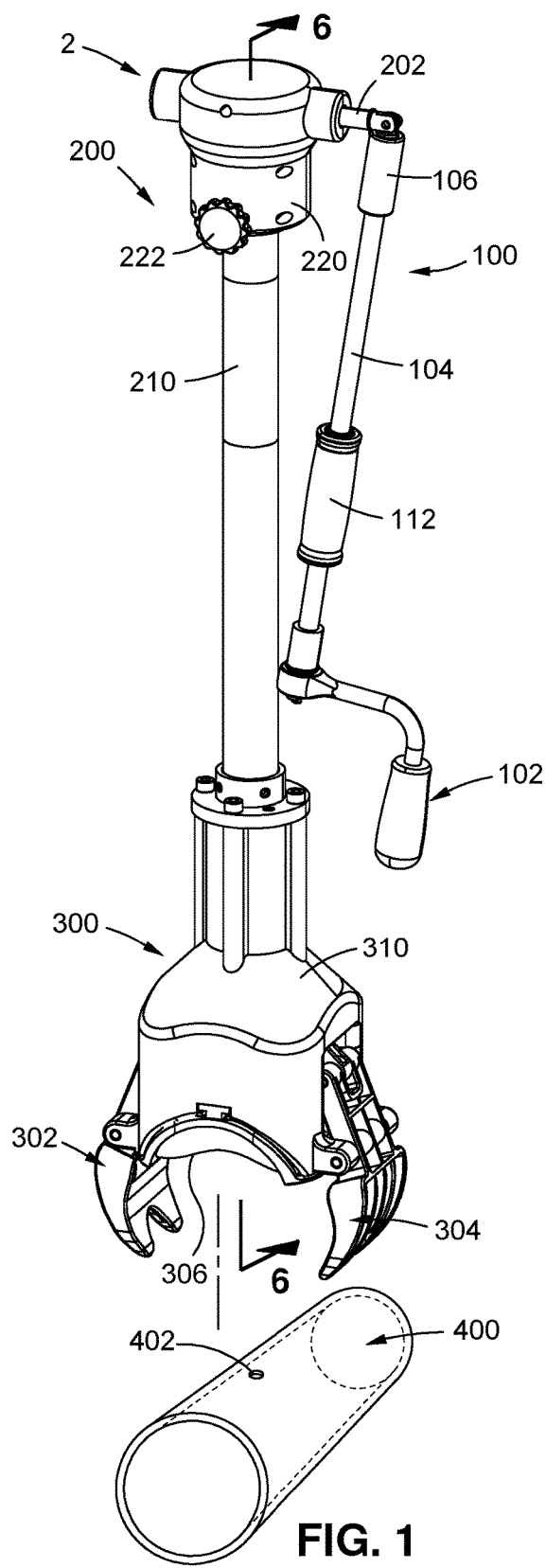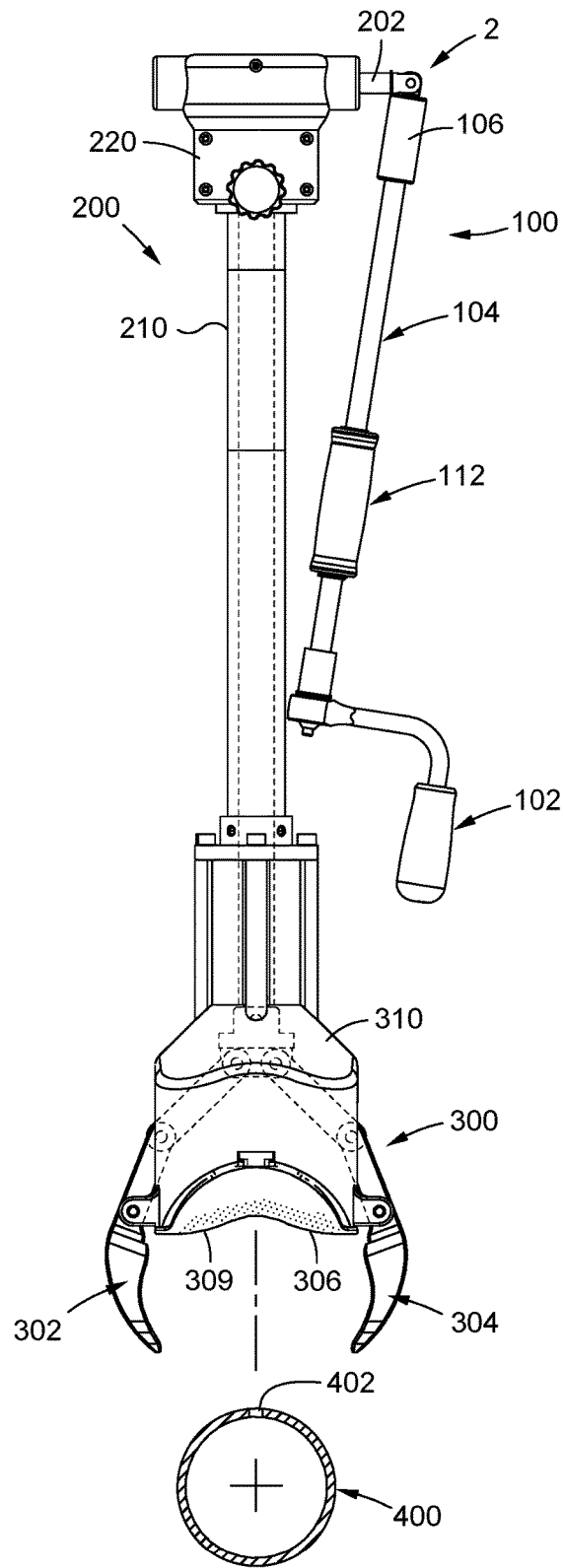
FIG. 1
FIG. 2

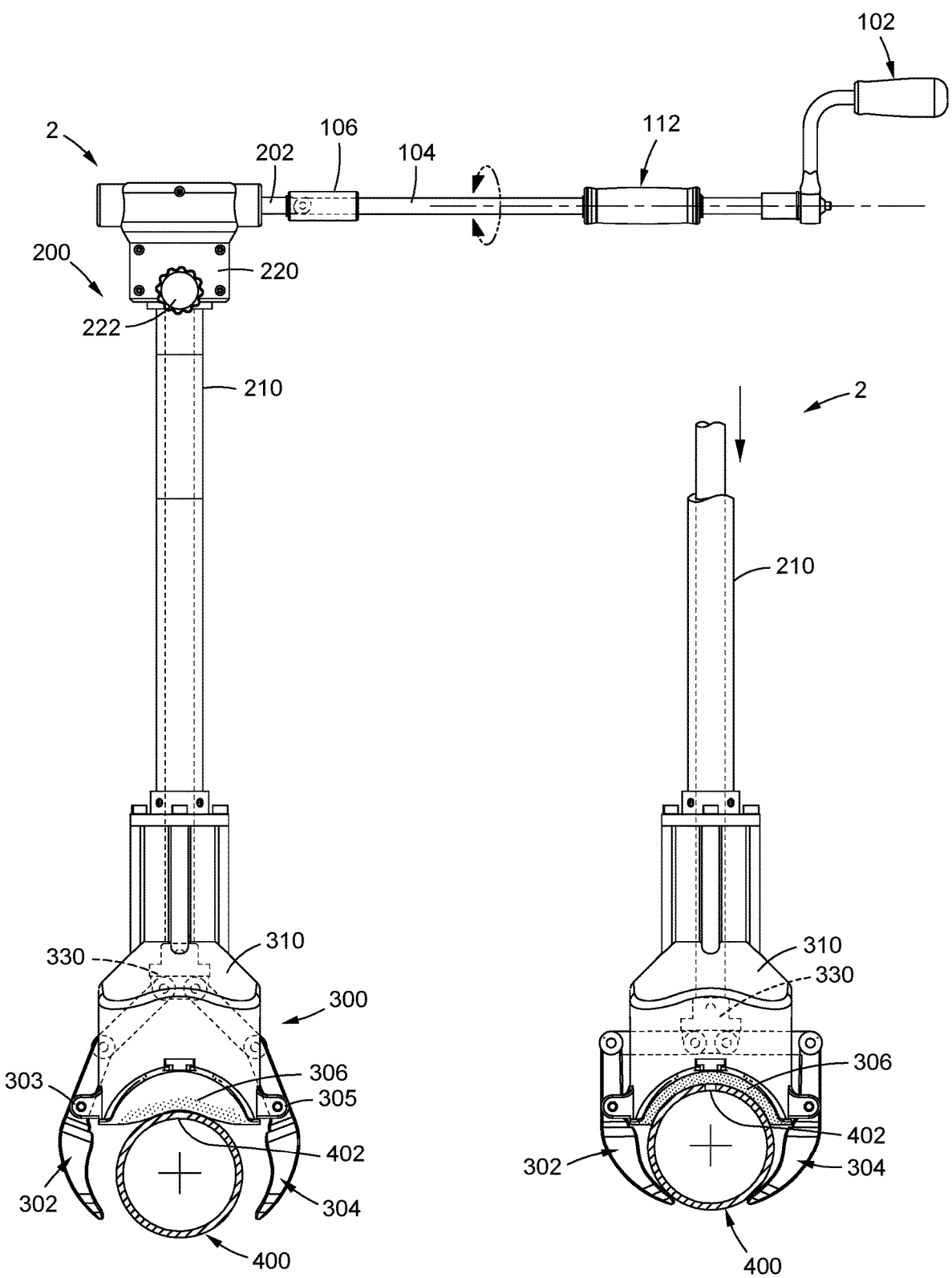

GAS LINE SEAL CLAMP AND METHOD OF SEALING A GAS LINE

RELATED APPLICATION DATA

The present application claims priority to U.S. Provisional Application Ser. No. 63/198,090, filed Sep. 28, 2020, which application is incorporated by reference in its entirety herein.

BACKGROUND

Many gas lines are formed from synthetic materials, such as polyethylene (PE). Sometimes during construction or excavation, these gas lines may be damaged by construction equipment. When the gas lines are damaged (e.g., punctured), gas escapes into the environment, presenting a hazardous risk to the environment and those nearby. Furthermore, these gas lines are usually buried at a depth of around 3 feet, which makes them somewhat difficult to access and repair.

BRIEF DESCRIPTION OF THE DRAWINGS

FIGS. 1 and 2 show exploded and front views of a seal clamp, partially shown in hidden line drawing, and shown with a gas line or pipe spaced from the seal clamp, in accordance with one non-limiting embodiment of the disclosed concept;

FIG. 3 shows a front view of the seal clamp of FIGS. 1 and 2 engaging the gas line, and with claws or clamps of the seal clamp in an OPEN position;

FIG. 4 shows a front view of a portion of the seal clamp of FIG. 3, and with the claws or clamps in a CLOSED position;

The components in the figures are not necessarily to scale, emphasis instead being placed upon illustrating the principles of the invention. In the figures, like reference numerals designate corresponding parts throughout the different views.

DETAILED DESCRIPTION OF EMBODIMENTS

Figure 5:
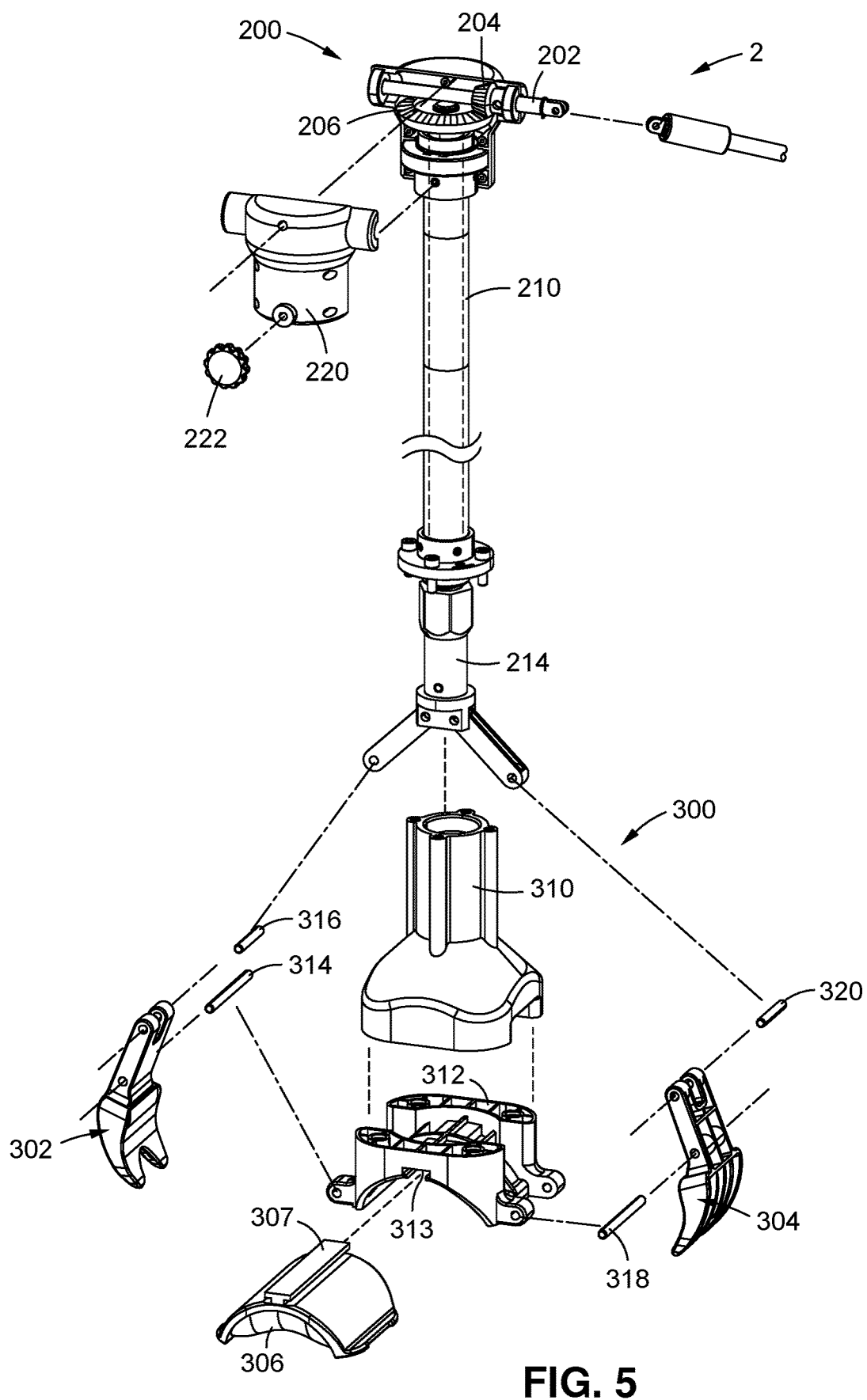
FIG. 5 shows an exploded isometric view of a portion of the seal clamp of FIGS. 1-4.

As employed herein, the term "coupled" shall mean connected together either directly or through one or more intermediate parts or components.

As employed herein, the term "number" shall mean one or an integer greater than one (e.g., a plurality).

In order to quickly seal off a damaged gas line, such as a gas line or pipe 400 shown in FIGS. 1-4, a gas line seal clamp 2 is provided according to the embodiments shown and described herein. As shown in FIG. 1, the seal clamp 2 includes a handle assembly 100, a transfer or drive assembly 200 cooperable with the handle assembly 100, and a clamping assembly 300 cooperable with the transfer assembly 200 in order to compress a seal into engagement with the gas line or pipe 400, such as to seal a puncture 402 (or other damage/opening) in the gas line 400. In this manner, the seal clamp 2 provides a desirable way for an operator to seal the gas line 400, which may be leaking gas and be positioned several feet (e.g., at least 3 feet) below the surface of the ground.

In order to do this, the handle assembly 100 may first be operated by a user, who will then be able to position the clamping assembly 300 on the gas line 400. By rotating (or otherwise actuating) a handle 102 of the handle assembly 100, the clamping assembly 300 is advantageously tightened onto the gas line 400, compressing a seal member 306 of the seal clamp 2 into engagement with the gas line 400 at the location of the puncture or other opening 402, thereby preventing gas from continuing to escape and giving repair personnel time to arrive and repair the damage to the gas line 400 (such as by closing or shutting off the gas line 400 and then making a permanent fix thereto, such as by splicing a new section of pipe into the damaged section of the gas line 400).

In one embodiment, the seal clamp 2 generally has a head portion or drive head where the handle 102 engages certain components of the transfer or drive assembly 200 and a clamping portion which includes the clamping assembly 300, where the head portion and the clamping portion are spaced apart from one another by a distance. In one embodiment, this distance may be 2-6 feet (or more) as described below, thus allowing an operator to engage the clamping assembly 300 with a pipe 400 which may be located below-grade by several feet, while operating the seal clamp 2 via the handle 102 remotely, such as above grade.

Figure 6:
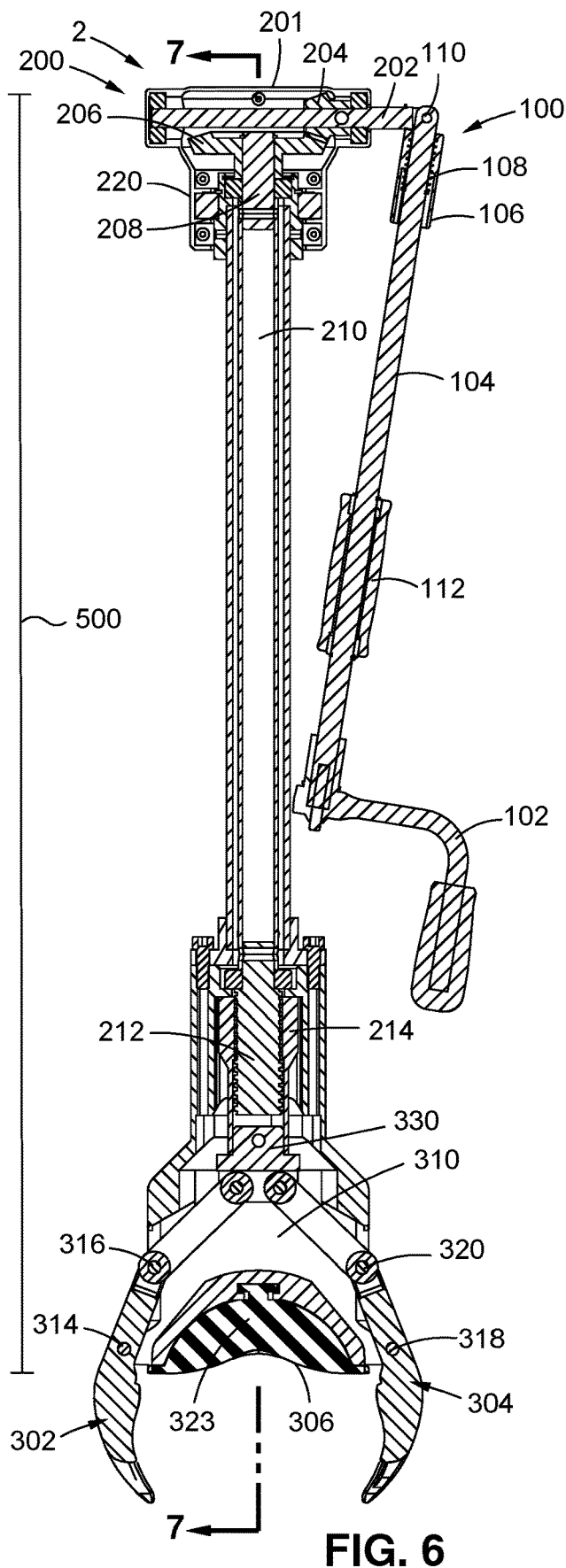
FIGS. 6-8 show different section views of the seal clamp.
Figure 7:
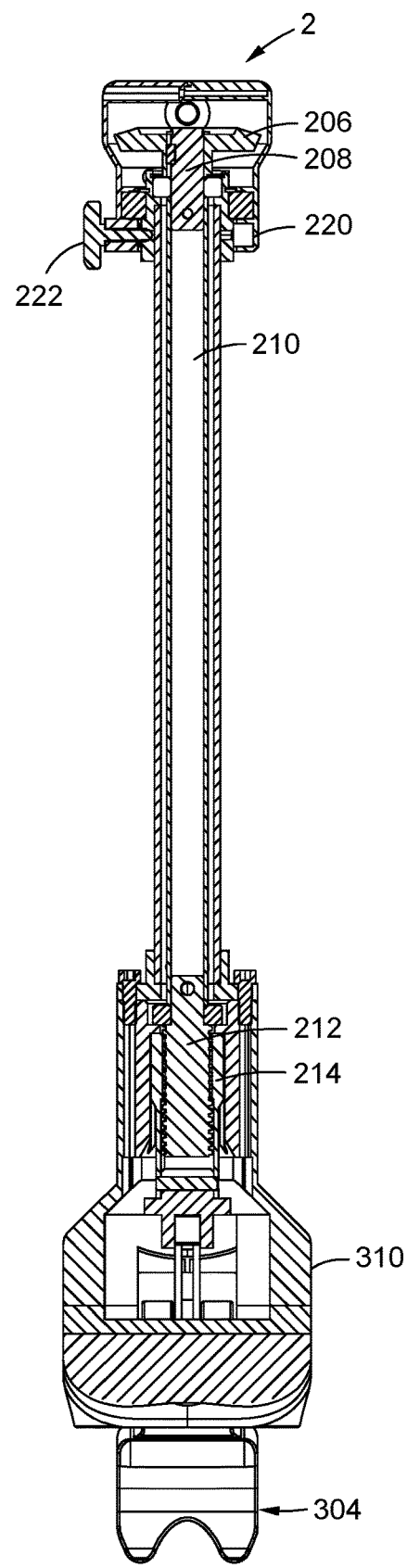

FIGS. 1 and 2 show the seal clamp 2 spaced from the gas line 400, and FIGS. 3 and 4 show the seal clamp 2 engaging the gas line 400, in OPEN and CLOSED positions, respectively. The handle assembly 100 may comprise the handle 102 and a bar or arm 104 rotatably coupled to the handle 102 (where the handle 102 may be offset, such as in a "crank" format, relative to the bar or arm 104). The bar 104 is pivotably coupled to a drive shaft 202 of the transfer assembly 200, such as by a pivot or hinge 110. As can be seen by comparing FIGS. 1 and 2 to FIGS. 3 and 4, the bar 104 may be moved by an operator between a FIRST position corresponding to that where the handle 102 is located proximate to the clamping assembly 300 and a SECOND position corresponding to that where the handle 102 is located opposite and distal to the clamping assembly 300. In other words, the bar 104 can be moved to a stowed/collapsed position in which it extends generally along the transfer assembly 200, thus causing the seal clamp 2 to have a reduced dimension and allowing the seal clamp 2 to be quickly and easily transported and stored. The bar 104 can also be moved or extended to a use position wherein the bar 104 extends outwardly from the seal clamp 2, such as generally perpendicular thereto and parallel to the ground. In one embodiment, as illustrated in FIGS. 3 and 6, a sleeve 106 may be movably mounted on the bar 104, and be movable between a retracted and an extended position. An operator may move the sleeve 106 to the retracted position by pulling it towards the handle 102, such as against a means for biasing (such as spring located between the sleeve 106 and the bar 104), thus causing the sleeve 106 to move away from the pivot 110. At that time, the bar 104 can be pivoted to its folded or stored position or be moved or rotated outwardly to its use position. When the bar 104 is in its use position, the sleeve 106 is preferably biased over the pivot 110, effectively preventing pivoting of the bar 104 relative to the drive shaft 202.

Once an operator has positioned the seal clamp 2 such that the clamping assembly 300 engages the gas line 400, subsequent rotation of the handle 102 will cause the seal clamp 2 to move from the OPEN position depicted in FIG. 3 to the CLOSED position depicted in FIG. 4. As shown, the clamping assembly 300 includes a first claw or clamp 302, a second claw or clamp 304, and a seal or seal member 306. As disclosed below, the seal member 306 may be coupled to a mount or base 312. In one example embodiment, the seal member 306 has a partially cylindrical-shaped inner surface 309 corresponding to a cylindrical-shaped external surface of gas line 400. Accordingly, and as will further be discussed below, responsive to movement (e.g., rotation) of the handle 102, the first and second claws or clamps 302,304 move from an OPEN position to a CLOSED position in order to compress the seal member 306 into the puncture 402 or other opening in the gas line 400. In other words, responsive to rotation of the handle 102, which drives the bar 104, the claws or clamps 302,304 move between OPEN and CLOSED positions.

It will thus be appreciated that the transfer assembly 200 is configured to transfer rotary motion of the handle 102 into opening and closing motion of the first and second claws or clamps 302,304. For example, when the handle 102 rotates, the bar 104, which is connected to the drive shaft 202 of the transfer assembly 200, is rotated and causes the first and second claws or clamps 302, 304 to open and close (depending upon the direction that the handle 102 rotates the drive shaft 202, as described below). Specifically, it does this by transferring rotary handle motion into a focused clamping movement via other transfer components.

These transfer components, as shown mostly in FIGS. 5-8, include gears (e.g., first and second bevel gears 204, 206) and a number of interconnect components (e.g., axle 208, extension tube 210, lead screw 212, threaded adaptor 214). The transfer components may further comprise a drive housing 220, and a latch knob 222 threadably coupled to the drive housing member 220.

The transfer components may include one or more elements for converting rotation of the handle 102 about a first axis (such as a generally horizontal axis) to rotation of one or more elements about a perpendicular axis (such as a generally vertical axis). In particular, the first bevel gear 204 is configured to be driven by the handle 102 (via the bar 104 and drive shaft 202), such as relative to a horizontal axis, and to drive the second bevel gear 206, which drives the axle 208 about an axis perpendicular thereto, such as a vertical axis. The axle 208 is coupled to the second bevel gear 206 and extends from second bevel gear 206 towards the clamping assembly 300.

In one embodiment, the axle 208 drives the extension tube 210. The extension tube 210 may have various lengths, but is generally an elongate force-transmitting member which transmits force from the axle 208 to a lead screw 212. For example, the extension tube 210 may be 3-5 feet length. A top end of the extension tube 210 may be connected to the axle 208, such as via a pin or other connector (or press fit, threading engagement, etc.). The lead screw 212 is coupled to the extension tube 210, such as at the second or bottom end of the extension tube 210, such as via one or more pins. The extension tube 210 may be generally hollow (or at least have hollow ends), whereby a portion of the axle 208 may fit into the top of the extension tube 210 and a portion of the lead screw 212 may extend into the bottom of the extension tube 210.

The lead screw 212 extends outwardly from the bottom of the extension tube 210. At least a portion of the lead screw 212 that extends outwardly form the extension tube 210 is threaded. The threaded portion of the lead screw 212 engages a threaded adaptor 214. The threaded adaptor 214 may comprise a collar-type element which has one or more threads at an interior thereof for engaging the threads on the lead screw 212. As described below, the threaded adaptor 214 is mounted for movement by the lead screw 212.

Figure 8:
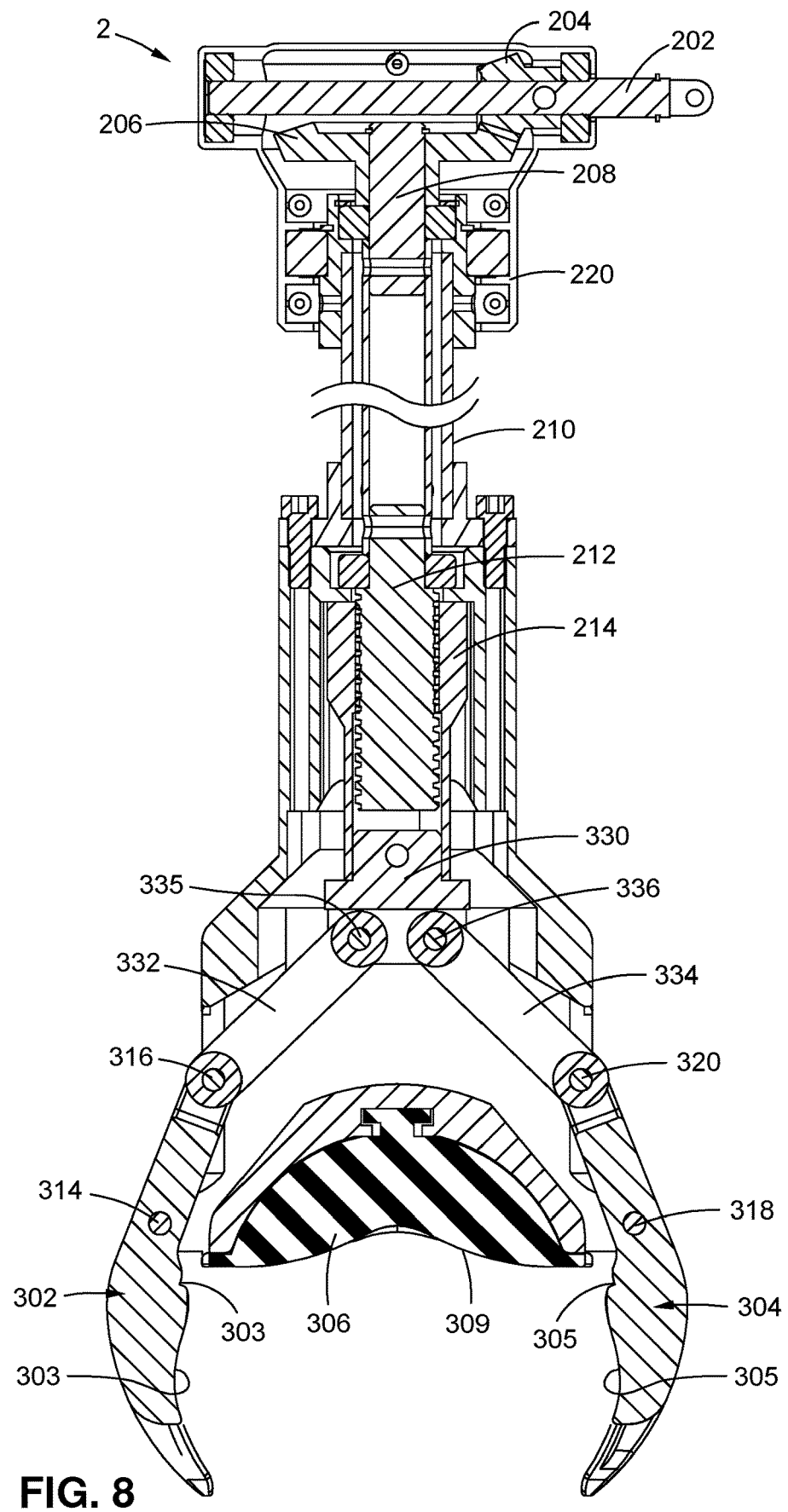

As illustrated in FIG. 8, a lower or bottom portion of the threaded adaptor 214 is connected to the clamping assembly 300. Referring to FIGS. 5 and 8, the clamping assembly 300 may comprise a housing 310, a base or mount 312 coupled to the base 310, the first movable claw or clamp member 302, the second movable claw or clamp member 304, and the seal or seal member 306.

In embodiment, the first claw or clamp 302 defines a lower or gripping portion, which may define a generally concave inner surface 303, such as for accepting the exterior of the pipe 400, and the second claw or clamp 304 may similarly define a generally opposing concave inner surface 305 for accepting an opposing portion of the exterior of the pipe 400.

The first and second claws or clamps 302,304 are mounted for pivoting movement. The first claw 302 is pivotally mounted to the housing 310, such as via a pin 314, and the second claw 304 is pivotally mounted to the housing 310, such as via a similar pin 318 (such as at a spaced/opposing portion of the housing 310.

One or more coupling members are configured to couple or connect the first and second claws 302,304 to the threaded adaptor 214, whereby when the threaded adaptor 214 moves, the first and second claws 302,304 are moved. In particular, a first drive link 332 is pivotally connected (such as at its first or top end) to the threaded adaptor 214, such as via a linkage connector 330 located at a bottom thereof opposite the lead screw 212, such as by a pin 335. The first drive link 332 is pivotally connected (such as at its second or bottom end) to the first claw or clamp 302 such as at a top end of the first claw 302 generally opposite its pipe-engaging portion). Likewise, the second drive link 334 is pivotally connected (such as at its first or top end) to the threaded adaptor 214 (again, such as to the linkage connector 330), such as by a pin 336. The second drive link 334 is pivotally connected (such as at its second or bottom end) the second claw or clamp 304(such as at a top end of the second claw 304 generally opposite its pipe-engaging portion).

The base 312 is connected to the housing 310 and is generally located between the first and second claws or clamps 302,304. The seal member 306 is connected to and extends outwardly/downwardly from the base 312 so as to also be positioned between the first and second claws 302,304. In one embodiment, the seal member 306 is detachably connected to the base 312, such as via a tongue and groove mechanism. For example, the seal member 306 may have an outwardly extending tongue or beam 307 (FIG. 5) that is located on the top side thereof (opposite the side that faces the gas line or pipe 400) and engages a mating groove 313 in the base 312. The tongue 307 might have a "T" shaped cross-sectional shape for engaging a similarly shaped groove 313. The tongue 307 may extend along a top of the seal 306 and the groove 313 may extend from a first end to a second end of the base 312 (along a line parallel to a line that extends between the first and second claws 302,304 (and parallel to a gas pipe 400 engaged thereby). This arrangement allows the seal member 306 to be removed or replaced by a sliding engagement with the base 312, but securely retains the seal member 306 during compression against a pipe 400.

In one embodiment, the seal member 306, or at least the bottom portion thereof, comprises a soft/conforming but durable material. As one example, the seal member 306 may comprise a silicon material, such as having a durometer rating of 50 or 60 Shore A. The seal member 306 may also have a thickness, such as 0.5 inches-2 inches.

In general, the transfer/drive assembly 200 translates force from the handle assembly 100 into movement of the clamping assembly 300, and namely movement of the first and second claws or clamps 302,304. Further, the seal clamp 2 facilitates this translation over a distance—which as which is great enough to permit an operator to stand a relatively large distance from gas line 400 (e.g., due to the length of extension tube 210 and handle assembly 100), which is below the surface of the ground. In one example embodiment, the seal member 306 has a centroid or center 323, the transfer or drive assembly 200 has a distal location 201 (such as at the drive head) where the centroid 323 (and thus the seal member 306) is spaced at least 2.5 feet, and preferably 3-4 feet or more (preferably linearly), from the distal location 201 (and thus the drive head and associated handle 102) in order to advantageously allow operators to stand a relatively large distance from gas line 400.

In use, an operator locates the clamping assembly 300 at the location of the puncture 402 of the gas line or pipe 400 (with the first and second claws 302,304 in a retracted or open position, such as illustrated in FIG. 3). The operator locates the seal clamp 2 so that the seal member 306 is positioned over/against the pipe 400 at the area of the puncture 402. The operator then remotely operates the clamping assembly 300 via rotation of the handle 102. The operator may place one hand on the bar 104, or preferably a grip 112 which is located on the bar 104 (and through which the bar 104 may rotate) and may then grasp and turn the handle 102 with the other hand.

In one embodiment, when the operator turns the handle 102 in the clock-wise direction, it turns the bar 104, which turns the drive shaft 202, which turns the first bevel gear 204, which turns the second bevel gear 206, which turns the axle 208, which turns the extension tube 210, which drives the lead screw 212. The threads on the lead screw 212 engage the threads on the threaded adaptor 214. This causes the linkage connector 330 to be driven downwardly, which in turn causes a pivoting of the first and second claws or clamps 302,304 from the OPEN position depicted in FIG. 3 to the CLOSED position depicted in FIG. 4. Accordingly, in one example embodiment, transfer or drive assembly 200 is configured to translate rotary motion of handle 102 into a linear motion of the linkage connector 330 in order to effectuate a pivoting movement of the first and second claws or clamps 302,304, between OPEN and CLOSED positions.

More importantly, as the first and second claws or clamps 302,304 are pivoted to a CLOSED position, the engagement of the pipe 400 with the inner surfaces 303,305 of the first and second claws or clamps 302,304 causes the seal member 306 to be pulled downwardly into engagement with the pipe 400 at the location of the puncture 402, thus causing the seal member 306 to be pressed into engagement with the exterior of the pipe 400 around the puncture 402—and most preferably due to the flexibility of the seal member 306, allows the seal member 306 to compress into the puncture 402 (e.g. be pressed into the wall of the pipe 400 itself towards the open interior of the pipe), as shown in FIG. 4. As a result, undesirable leakage of gas can be avoided, allowing time to fully repair the gas line 400.

Likewise, the seal clamp 2 can be removed (such as after gas has been turned off to the line and a permanent repair is to be made), such as by rotating the handle 102 in the opposing direction (such as a counter-clockwise direction). For example, this movement causes the threaded adaptor 214, and thus the linkage connector 300, to be drawn upwardly, thus causing the first and second claws or clamps 302,304 to pivot towards the OPEN position illustrated in FIG. 3.

In accordance with one embodiment of the disclosed concept, the latch knob 222 is threadably coupled to the drive housing 220 and can be threaded into and out of the drive housing 220 to selectively engage the extension tube 210 (such as a sleeve at the top thereof). When the latch knob 222 is not threaded into engagement with the extension tube 210, the position of the drive housing 220 may be changed relative to the extension tube 210, and thus the first and second claws or clamps 302,304. By tightening the latch knob 222, the operator may lock the drive head into a desired position relative to extension tube 210 (and the clamping assembly 300).

For instance, as illustrated in FIG. 1, the seal clamp 2 may be configured (such as by use of the latch knob 222) so that the handle 102 extends outwardly along a line which is perpendicular to axis of the pipe 400. In this orientation, the seal clamp 2 generally extends upwardly from the pipe 400, such as upwardly out of a trench or hole in the ground, and the handle assembly 100 then extends laterally from the drive head of the seal clamp 2, such as outwardly so that the handle 102 is located to the side of the trench or hole in the ground—and thus away from gas that is leaking from the pipe 400 and escaping upwardly through the trench or hole.

However, in some cases the puncture 402 may be offset (not at the top of the pipe 400), such as towards one of the sides of the pipe 400. In such an event, placement of the seal clamp 2 in the manner described above may cause the seal clamp 2 to be tilted (not vertical), and this may then cause the handle 102 to hit the ground or otherwise be difficult to turn/access. In that event, the operator may release the latch knob 222 and rotate the drive head so that the handle 102 extend generally parallel to the axis of the pipe 400. The operator and then effectively turn the handle 102 without interference, but is also still located a distance from the puncture 402 and associated leaked gas.

It will further be appreciated that a method of sealing a puncture 402 in a gas line 400 includes the steps of providing a seal clamp 2 having a handle assembly 100 including a handle 102, a transfer or drive assembly 200 cooperable with the handle 102, and a clamping assembly 300 comprising a first and second claws or clamps 302,304, and a seal member 306, where the first and second claws or clamps 302,304 are moved by application of force applied to the handle assembly 102, as transmitted by the transfer or drive assembly 200. The method further includes moving the handle 102 in order to move the first and second claws or clamps 302,304 from an OPEN position to a CLOSED position, thereby compressing the seal member 306 into the puncture 402 and sealing the gas line 400.

The seal clamp 2 may have other configurations than described above. For example, in one embodiment, the seal clamp 2 includes an elongate tube 210. The use of a tube 210 has advantages, including coupling of the tube to other elements (such as by accepting a portion of the axle 208 and the lead screw 212 therein), and also by then reducing the weight of the seal clamp 2. However, the elongate tube 210 might instead be solid, such as comprising a rod or the like.

In some embodiments, the handle assembly 100 might be configured for other than rotational movement. For example, the handle assembly 100 might be pivotally connected to the transfer or drive assembly 200 for pivoting motion or the like, such as permitting the user to open and close the first and second claws or clamps 302,304 via "jacking" motion. A particular advantage of the configuration of the seal clamp 2 described herein is that: 1) a force applied to the handle 102 is multiplied to create a much higher sealing force at the seal member 306, and 2) the first and second claws or clamps 302,304 can be opened relatively quickly by rotation or spinning of the handle 102. In particular, in one embodiment of the invention, the handle 102 as an offset cranking distance which creates a first force-multiplying effect upon the bar 104 and thus the drive shaft 202. Further, the bevel gears 204,206 effectuate second force-multiplying effect, as does the engagement or driving of the lead screw 212 with the threaded adaptor 214. In total, a force multiplier or 20 or more may be generated. This is necessary because gas within the pipe 400 may be at 100-150 psi. A rupture 402 having an area of 1 square inch thus requires at 100-150 psi of opposing sealing force. Such a force would be difficult for an operator to directly generate. In accordance with the preferred embodiment of the invention, a user might only be required to apply a force of 10 pounds in order to generate sealing force of 200 pounds.

One advantage of the seal clamp 2 is that is it manually operable and thus easy to maintain. However, the seal clamp 2 might be powered. For example, a motor may be used to drive the drive assembly 200, such as the drive shaft 222. The motor might be powered, for example, by a rechargeable battery. Of course, other drive means might be utilized, such as a power drill, etc.

Another advantage of the seal claim 2 is that it is relatively lightweight and portable. As indicated, when the handle assembly 100 is in the folded or stowed position, the seal clamp 2 is generally elongate and narrow. An operator might thus store the seal clamp 2 on a work truck or the like. In the event of a gas line rupture, the operator might grab the seal clamp 2, unstow the handle assembly and then use the seal clamp 2 in the manner described above to seal the rupture until repair personnel can arrive.

It should be mentioned that while the above embodiment is described with reference to gas line repair, the tool may be used for a various number of different pipes conveying any number of different fluids. Further, the seal clamp 2 may be used with pipes 400 of different sizes, such as 2, 4 or 6 inches (outer diameter/OD). However, in some embodiments, the size of the seal member 306 and/or first and second claws or clamps 302,304 may need to be varied when the pipe diameter changes significantly.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A seal clamp comprising:
a handle assembly comprising a handle;
a transfer assembly cooperable with the handle; and
a clamping assembly comprising a first clamp, a second clamp, and a seal member coupled to the first and second clamps, the first and second clamps being cooperable with the transfer assembly, the seal member being structured to seal a puncture in a gas line,
wherein, responsive to movement of the handle, the first and second clamps move from an OPEN position to a CLOSED position in order to compress the seal member into the puncture,
wherein the handle assembly further comprises a bar rotatably coupled to the handle, wherein, responsive to rotation of the handle with respect to the bar, the first and second clamps move between the OPEN and CLOSED positions, wherein the transfer assembly comprises a drive shaft pivotably coupled to the bar such that the bar can pivot with respect to the drive shaft toward and away from the clamping assembly, and wherein, responsive to rotation of the handle, the bar rotates the drive shaft, thereby causing the first and second clamps to move between the OPEN and CLOSED positions.

2. The seal clamp according to claim 1, wherein the transfer assembly further comprises a first bevel gear and a second bevel gear engaging the first bevel gear, wherein the first bevel gear is coupled to the drive shaft such that rotation of the drive shaft causes rotation of the second bevel gear, thereby causing the first and second clamps move between the OPEN and CLOSED positions.

3. The seal clamp according to claim 1, wherein the clamping assembly further comprises a retaining member coupled to the first clamp, the second clamp, and the seal member.

4. The seal clamp according to claim 3 wherein the retaining member is coupled to the seal member via a tongue and groove mechanism.

5. The seal clamp according to claim 1, wherein the transfer assembly comprises a first gear and a second gear engaging the first gear, and wherein, responsive to rotation of the handle, the first gear rotates the second gear, thereby moving the first and second clamps between the OPEN position and the CLOSED position in order to compress the seal member into the puncture.

6. The seal clamp according to claim 5, wherein the transfer assembly further comprises a number of interconnect components comprising an axle coupled to the second gear and extending from the second gear toward the clamping assembly.

7. The seal clamp according to claim 6, wherein the number of interconnect components further comprises an extension tube coupled to the axle, a lead screw coupled to the extension tube, and a threaded adaptor engaging the lead screw and the clamping assembly.

8. The seal clamp according to claim 1, wherein the seal member has a centroid, wherein the transfer assembly has a distal location disposed opposite and distal the centroid, and wherein the centroid is spaced at least 2.5 feet from the distal location.

9. The seal clamp according to claim 1, wherein the transfer assembly comprises an extension tube cooperable with the handle, a sleeve member surrounding the extension tube, and a latch knob threadably coupled to the sleeve member.

10. The seal clamp according to claim 9, wherein the latch knob is structured to extend through a wall of the sleeve member and engage the extension tube in order to maintain the sleeve member in a predetermined position with respect to the extension tube.

11. The seal clamp according to claim 10, wherein, responsive to removal of the latch knob from the sleeve member, the sleeve member is structured to rotate independently with respect to the extension tube, thereby allowing the handle to move to a new position with respect to the clamping assembly.

12. The seal clamp according to claim 1, wherein the bar is configured to move between a FIRST position corresponding to the handle being disposed proximate the clamping assembly and a SECOND position corresponding to the handle being disposed opposite and distal the clamping assembly.

13. A seal clamp comprising:
a handle assembly comprising a handle;
a transfer assembly cooperable with the handle; and
a clamping assembly comprising a first clamp, a second clamp, and a seal member coupled to the first and second clamps, the first and second clamps being cooperable with the transfer assembly, the seal member being structured to seal a puncture in a gas line, wherein, responsive to movement of the handle, the first and second clamps move from an OPEN position to a CLOSED position in order to compress the seal member into the puncture, wherein the transfer assembly comprises a lead screw and a threaded adapter engaging the lead screw, wherein the clamping assembly further comprises a linkage connector coupled to the first and second clamps, and wherein, responsive to movement of the handle, the lead screw rotates about a longitudinal axis within the threaded adapter and drives the linkage connector downwardly along the longitudinal axis, thereby moving the first and second clamps between the OPEN and CLOSED positions.

14. The seal clamp according to claim 1, wherein the first and second clamps each have a groove, and wherein, when the first and second clamps each move from the OPEN position to the CLOSED position, the seal member moves into the grooves of the first and second clamps.

15. The seal clamp according to claim 1, wherein the seal member comprises a partially cylindrical-shaped inner surface corresponding to a cylindrical-shaped external surface of the gas line.

16. The seal clamp according to claim 1, wherein the clamping assembly further comprises a linkage connector coupled to the first and second clamps, and wherein the transfer assembly is configured to translate rotary motion of the handle into linear motion of the linkage connector in order to move the first and second clamps between the OPEN and CLOSED positions.

17. A method of sealing a puncture in a gas line, comprising the steps of:

providing a seal clamp comprising a handle assembly comprising a handle, a transfer assembly cooperable with the handle, and a clamping assembly comprising a first clamp, a second clamp, and a seal member coupled to the first and second clamps, the first and second clamps being cooperable with the transfer assembly; and moving the handle in order to move the first and second clamps from an OPEN position to a CLOSED position, thereby compressing the seal member into the puncture and sealing the gas line, the method further comprising providing the transfer assembly with a first gear and a second gear engaging the first gear, and responsive to rotation of the handle, rotating the first gear in order to rotate the second gear, thereby moving the first and second clamps between the OPEN position and the CLOSED position in order to compress the seal member into the puncture.

18. The seal clamp according to claim 1, wherein the bar is configured to pivot with respect to the drive shaft between a first position in which the bar is disposed generally collinear with respect to the drive shaft, to a second position in which the bar extends along a length of the transfer assembly and is disposed generally perpendicular with respect to the drive shaft.

* * * * *